United States Patent [19]

Alexandrov et al.

[11] Patent Number: 4,568,225

[45] Date of Patent: Feb. 4, 1986

[54] CONTAINER FOR TRANSPORTING PIECE GOODS ALONG PIPE-LINES OF A PNEUMATIC CONVEYER

[76] Inventors: Adolf M. Alexandrov, ulitsa Chelyabinskaya, 19, korpus 4, kv. 457; Vitaly G. Iljukhin, ulitsa Medikov, 22, korpus 3, kv. 3; Jury A. Yashin, Yaroslavskoe shosse, 59, kv. 55; Igor V. Kiselev, ulitsa Tsjurupy, 24, korpus 1, kv. 39, all of Moscow, U.S.S.R.

[21] Appl. No.: 606,831

[22] PCT Filed: Aug. 31, 1982

[86] PCT No.: PCT/SU82/00031

§ 371 Date: Apr. 14, 1984

§ 102(e) Date: Apr. 14, 1984

[87] PCT Pub. No.: WO84/00946

PCT Pub. Date: Mar. 15, 1984

[51] Int. Cl.$^4$ ............................................. B65G 51/06
[52] U.S. Cl. .................................................. 406/186
[58] Field of Search ............... 406/185, 186; 220/334, 220/23

[56] References Cited

U.S. PATENT DOCUMENTS 3,690,593  9/1972  Kettering ........................ 406/186
3,940,091  2/1976  Ekama et al. .................... 406/186

FOREIGN PATENT DOCUMENTS 1122452  1/1962  Fed. Rep. of Germany ...... 406/185

Primary Examiner—Jeffrey V. Nase
Attorney, Agent, or Firm—Burgess, Ryan & Wayne

[57] ABSTRACT

A container having a mechanism for locking a pressing member comprises a toothed segment mounted in the body in a plane parallel to the intermediate wall and capable of limited movement in the plane of the wall in mutually perpendicular directions, for which purpose it is connected via a system of pivotally interconnected levers to the cover and via a tie with an axle secured to the intermediate wall, the axle mounting a lever with a toothed member for engaging the toothed segment in the course of transportation of goods and having a through slot near the toothed member for accommodating a roller mounted on the pressing member in such a manner that the geometrical axis of the roller is parallel to the axes of the journals of the pressing member. Mounted in the intermediate wall parallel to the slot for the journals of the pressing member is an additional through slot accommodating the roller and a horizontal slot accommodating the axle of a pivot interconnecting adjacent levers.

2 Claims, 6 Drawing Figures

CONTAINER FOR TRANSPORTING PIECE GOODS ALONG PIPE-LINES OF A PNEUMATIC CONVEYER

TECHNICAL FIELD

The present invention relates to pneumatic conveyers and, more particularly, to containers for transporting piece goods along pipe-lines.

BACKGROUND OF THE INVENTION

Known in the art is a container for transporting piece goods along pipe-lines of pneumatic conveyers, comprising a body shaped as a parallelepiped and closed with a cover connected thereto so that it can turn. The body accomodates intermediate walls secured near its butt walls and parallel thereto and having slots to accomodate journals of a member pressing goods, which is mounted in the body so that it can turn in the direction of turning of the cover. The member pressing the goods is provided with at least one mechanism for locking it in the course of transportation of piece goods in the container.

The locking mechanism comprises a lever whose one end portion has teeth made therein coaxially with a turning axle secured to the wall of the body through a bracket and engaging a worm mounted in the intermediate wall and extending with its one end portion to the outer surface of the body from the side of the butt wall. The other free end portion of the lever mounts a member secured thereon and engaging a hook provided on the member pressing goods. At the side coming out into the outer surface of the body and in the axial direction the worm is provided with a hole accomodating a detachable handle made as a crank and serving for turning the worm. This turn is made by the operator upon arrival of the container to its destination or upon its sending off. The cover is provided with a spring-loaded latch which holds it in the closed position and engages a holder rigidly secured to the body wall opposite to the one to which the cover is secured. The push button used for engaging the latch with the holder is disposed on the outer side of the container.

The known container is not convenient in operation as, in order to load or unload it, it has to be extracted from the pipe-line and, then, it is necessary to manually open the cover by having pressed the push button and after having inserted the handle into the hole of the worm, to turn the lever in order to release the pressing member. All these operations increase the time required for charging and discharging the container, that substantially decreases the efficiency of the conveyer.

Besides, the force with which the pressing member holds the piece goods in order to prevent their damage in the course of transportation completely depends on the operator, which cannot always provide for a required force of pressing holding the piece goods in the course of transportation.

DISCLOSURE OF THE INVENTION

The present invention had as its task provision of such a container for transporting piece goods along the pipe-lines of a pneumatic conveyer, in which the mechanism locking the pressing member would be of such a constructive embodiment that would make it possible to lock automatically the piece goods in the course of the cover closing with a preset pressing force.

This task is accomplished by that in a container for transporting piece goods along the pipe-lines of a pneumatic conveyer, comprising a body with a cover connected thereto so that it can turn and locked relative thereto in the course of transportation, and intermediate walls secured near its butt walls parallelly thereto and having slots accomodating journals of a member pressing the goods, which member is mounted in the body so that it can turn in the direction of the turning of the cover and has at least one mechanism locking it in the course of transportation, according to the invention, the mechanism locking the member pressing the goods comprises a toothed segment mounted in the body in a plane parallel to the intermediate wall and capable of a limited movement in the plane in mutually perpendicular directions, for which purpose it is connected via a system of pivotly interconnected levers to the cover and via a tie to an axle secured on the intermediate wall and mounting also a lever with a toothed member engaging the toothed segment in the course of transportation of piece goods and having a through slot made near the toothed member to accomodate a roller mounted on the pressing member in such a manner that its geometrical axis is parallel to the axes of the journals of the pressing member, an additional slot accomodating the roller and a horizontal slot accomodating the axle of a pivot interconnecting the adjacent levers of said system of levers being made in the intermediate wall parallelly to the slot accomodating the journals of the pressing member.

It is expedient to use the longitudinal slot made in the tie at the point of its connection with the axle and the stop secured on the intermediate wall and interacting with the toothed segment portion disposed near the bottom of the container for limiting displacement of the toothed segment.

This limitation of displacement of the toothed segment is very simple in design.

A container for transporting piece goods along the pipe-lines of a pneumatic conveyer, built in accordance with the present invention, makes it possible to load and unload piece goods without extracting the container from the pipe-line. Besides, in the container of the present invention it is possible to lock the piece goods automatically with a predetermind force upon closing of the cover. All this reduces the time necessary for loading and unloading the container, makes it easier for the operate to control the operation and increases the output of the pneumatic conveyer.

BRIEF DESCRIPTION OF THE DRAWINGS

The following description of a specific embodiment of the present invention is given with reference to the accompanying drawings, in which.

BEST MODE FOR CARRYING OUT THE INVENTION

Figure 1:
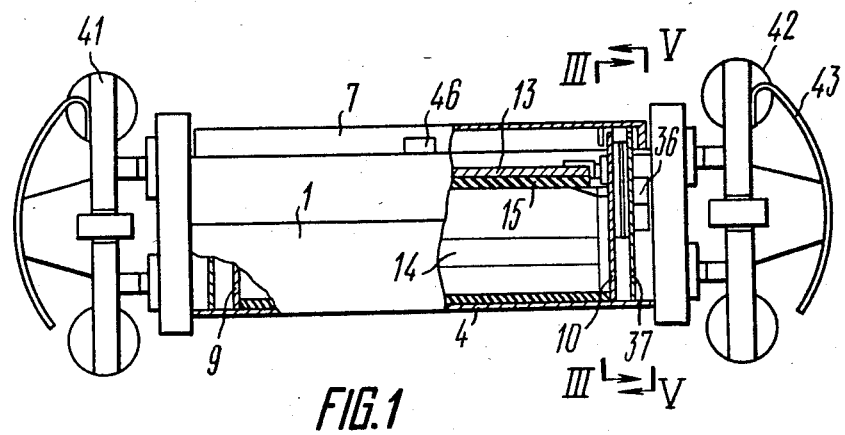
FIG. 1 shows a container for transporting piece goods, according to the invention, a side view with a partial section.

A container for transporting piece goods along the pipe-lines of a pneumatic conveyer comprises a body 1 (FIGS. 1 and 2) shaped as a parallelepiped formed by side walls 2 and 3, a bottom 4 and butt walls 5 and 6. From the top the container is closed with a cover 7 connected to the side wall 2 by means of pivots having a horizontal axle 8.

Figure 2:
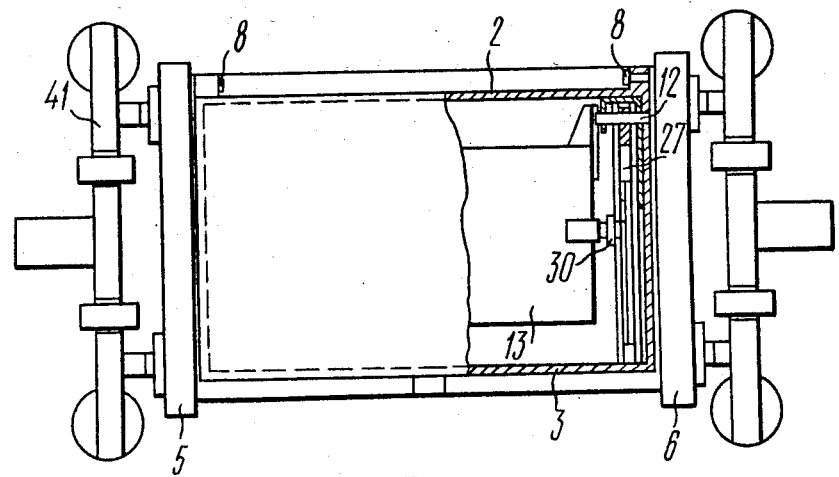
FIG. 2 shows a container for transporting piece goods, a top view with a partial section.
Figure 4:
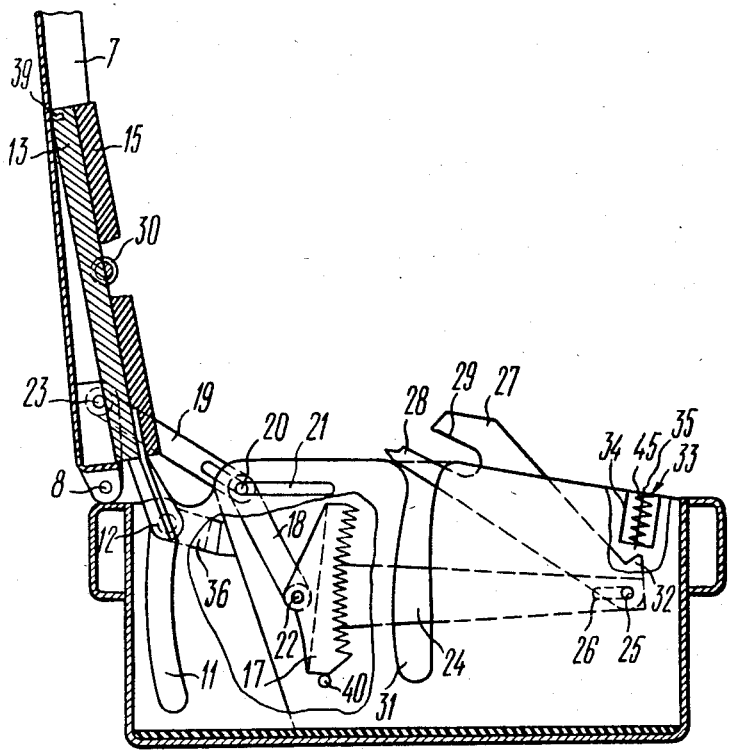
FIG. 4 is section III—III in FIG. 1, with the cover being opened.
Figure 3:
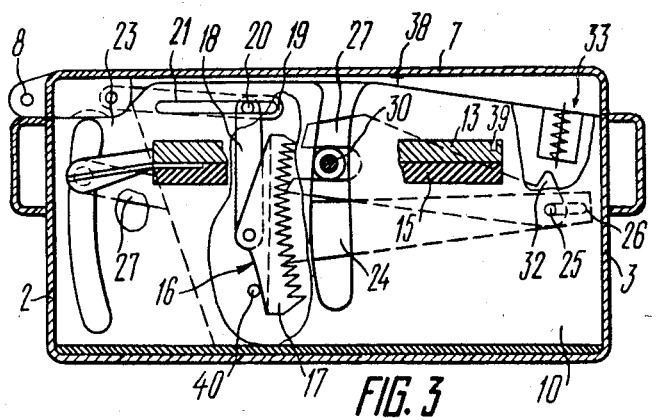
FIG. 3 is section III—III in FIG. 1, with the cover being closed.

Secured in the body 1 near its butt walls 5 and 6 and parallel thereto are intermediate walls 9 and 10, respectively. Made in the walls are vertical (according to the drawing) slots 11 (FIG. 4) used to accomodate journals 12 of a member 13 pressing piece goods 14 (FIG. 1). The pressing member 13 is mounted so that it can turn in the direction of the turning of the cover 7 and is shaped as a plate having a coating 15 made from an elastic material. The pressing member 13 has two mechanisms 16 (FIG. 3) for locking it in the course of transportation of the piece goods 14 in a container. These mechanisms are made absolutely identical and, therefore, whatever is later said with respect to one of them, equally concerns the other one as well.

Each locking mechanism 16 comprises a toothed segment 17 mounted in the body 1 parallel to the intermediate wall 9 and capable of a limited displacement in this plane in mutually perpendicular directions, for which purpose it is connected via a lever system comprising levers 18 and 19 interconnected by a pivot whose axle 20 is disposed in a horizontal slot 21 made in the intermediate wall 9 and providing for displacement of the toothed segment 17 in the vertical (according to the drawing) direction. The free end portion of the lever 18 is connected by means of a pivot with an axle 22 to the toothed segment 17, whereas the free end portion of the lever 19 is connected by means of a pivot with an axle 23 to the cover 7. The toothed member 17 is connected via a tie 24 rigidly connected thereto to an axle 25 secured to the intermediate wall 9. Made in the tie 24 is a longitudinal slot 26 allowing for displacement of the toothed segment 17 in the horizontal (according to the drawing) direction, as is indicated by the arrow A, and, at the same time, limiting the displacement.

Mounted on the axle 25 is also a lever 27 whose free end portion has a toothed member 28 and a through slot 29 (FIG. 4) made therein, the toothed member 28 engaging the toothed segment 17 and the through slot 29 being used for accomodating a roller 30 mounted on the pressing member 13. The roller 30 is mounted on the pressing member 13 in such a manner that its geometrical axis is parallel to the geometrical axes of the journals 12 of the pressing member 13. To move the roller 30 during turning of the lever 27, a through slot 31 substantially parallel to the slot 11 is made in the intermediate wall 9.

The lever 27 mounts a step 32 disposed near the axle 25 of its turning, and the intermediate wall 9 mounts a stop 33 comprising a body 34 accomodating a spring-loaded rod 35 interacting with the stop 32 when the cover 7 is open to hold the lever 27 in the upper position after its toothed member 28 is disengaged from the toothed segment 17.

Figure 5:
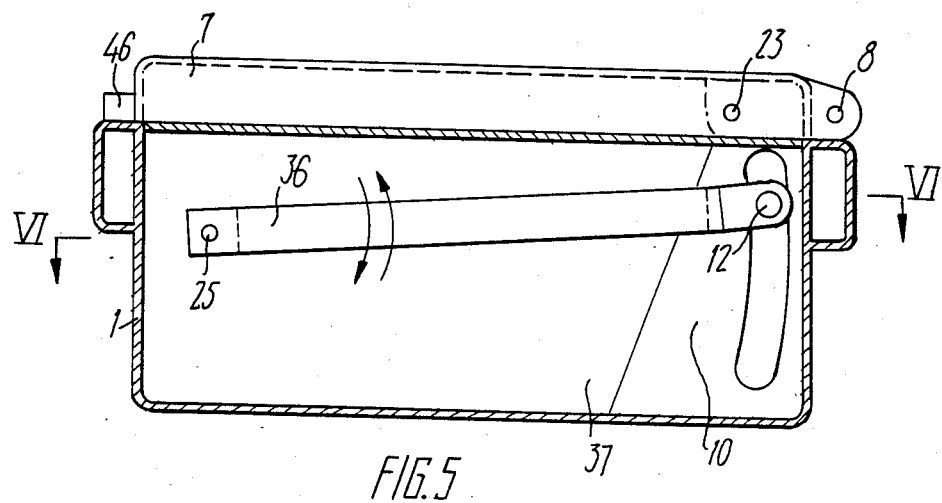
FIG. 5 is section V—V in FIG. 1.
Figure 6:
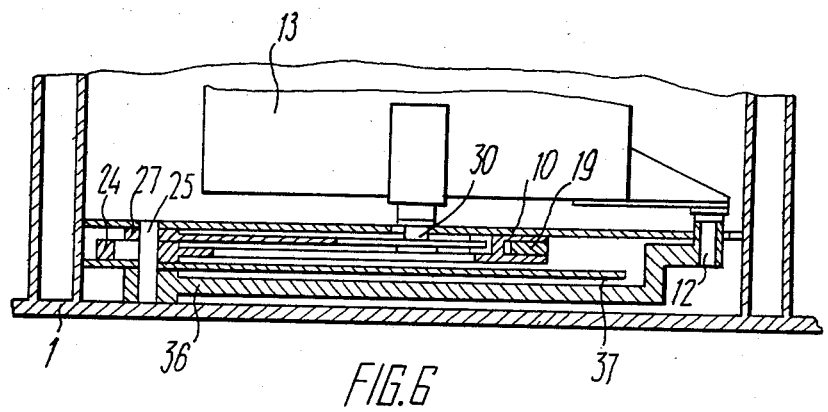
FIG. 6 is section VI—VI in FIG. 5.

The axle 25 also mounts a lever 36 (FIGS. 5, 6) whose free end portion is coupled with the journal 12 of the pressing member 13. This conection of the pressing member 13 with the axle 25 ensures stabilization of its position in space while it is being lowered or raised.

To provide a greater rigidity to the axles 25, additional intermediate walls 37 are mounted in the body 1 parallel to the intermediate walls 9, 10 and in such a manner that the levers 36 are disposed betweeen them and the respective butt walls 9 and 10.

To lock the pressing member 13 relative to the cover 7 when the latter is in the open position, use is made of a pin 38 provided on the cover 7, and a slot 39 made in the pressing member 13 which are interacting with each other when the cover 7 is in its open position.

In order to limit the displacement of the toothed segment 17 in the vertical downward (according to the drawing) direction, use is made of a stop 40 secured on the intermediate wall 9.

For moving along the pipe-line (not shown) of the pneumatic conveyer the container is provided with a truck comprising sealing cups 41 which carry drive wheels 42 and a bumper 43.

To provide for a better access to the content of the container when the cover 7 is opened, the levers 19 have longitudinal slots 44 made therein and providing for a turn of the cover 7 through a big angle when it is being opened.

The container for transporting piece goods along the pipelines of the pneumatic conveyer functions as follows.

At the terminal station of the pneumatic conveyer (not shown in the drawing) the container is in its initial position: the cover 7 is opened, the member 13 pressing the goods 14 is lifted, and they are both fixed with respect to each other with the aid of the pin 38 provided on the cover 7 and disposed in the slot 39 made in the member 13 pressing the goods. Besides, the lever 27 is held in the lifted position with the aid of the spring-loaded rod 35 interacting with the stop 32 on the lever 27.

The operator either manually or with the aid of a manipulator places the goods 14 (for example, books) into the container which during the whole operation of loading and closing is in the receiving trough of the station (not shown in the drawing).

Then, the operator lowers the pressing member 13 onto a book, whereby the pin 38 falls out of the slot 39 and onto the pressing member 13. The latter moves down, the journals 12 move in the slots 11 and the levers 36 connected with the journals 12 turn relative to the axles 25 counter-clockwise (according to the drawing).

While the pressing member 13 is being lowered the rollers 30 mounted thereon get into the slots 29 of the lever 27 and, during their further movement down and while sliding in said slots 29 move together with the levers 27 downward to enter the slots 31 made in the intermediate walls 9, 10 and slide along them. While the levers 27 are moving, the stops 32 overcome the force created by the springs 45 of the rods 35 and release themselves from the latter. The pressing member 13 is placed on the book 14, whereas the toothed members 28 of the lever 27 are positioned opposite the toothed segments 17.

The next moment the operator lowers the cover 7 by turning it clockwise on axles 8. When the cover 7 is being lowered, the levers 19 move relative to the axles 20 over the length of the longitudinal slot 44 made in each of the levers 19. Then, while the cover 7 is still being lowered the levers 19 coupled with the levers 19 by means of pivots with the axles 20 turn counter-clockwise relative to the axles 23 of the pivots connecting the levers 19 with the cover 7, whereby the axles 20 move in the horizontal slots 21 of the intermediate walls 9 to the right (according to the drawing). Then, the levers 19 together with the toothed members 17 first move translationally to the right over a distance limited by the length of the slots 26 in the ties 24 and towards the toothed members 28 of the levers 27, whereby the latter engage the toothed segments 17. The translational movement of the toothed segments 17 to the right is provided with the aid of the stops 40 which, when the cover 7 is being lowered, interact with the toothed segments 17 portion which is disposed the closest to the bottom 4 of the container, as well as the horizontal slots 21 in the intermediate walls 9 until the toothed segments 17 come off the stops 40. By having released themselves from the limiting action of the stops 40, the toothed segments 17 engaged with the toothed members 28 of the levers 27 and representing together with the latter one rotating pair move downward, turn counter-clockwise on the axles 25 and force the rollers 30 together with the levers 27 and, consequently, the pressing member 13 to follow them. This downward movement of the mentioned rotating pair takes place until the levers 18 and 19 carrying the toothed segments 17 engaged with the toothed members 28 of the levers 27 take such a position in which they thrust against one another. The cover 7 is closed, the latch 46 is actuated and the cover 7 is locked in the closed position. The latch 46 may be of any design suitable for the purpose.

When the container arrives to the place of its destination and is to be unloaded, the cover 7 is opened in the reverse order.

INDUSTRIAL APPLICABILITY

It is most expedient to use the container built in accordance with the present invention for transporting books in libraries.

It is possible to use the container of the present invention for transporting other piece goods requiring especially careful handling.

We claim:

1. A container for transporting piece goods along pipelines of a pneumatic conveyer, comprising a body having butt walls; a cover pivotally connected to said body and locked relative thereto during the transportation; intermediate walls secured to said body near said butt walls, and parallel to the latter and having slots; a pressing member for pressing said goods and having journals accomodated in said slots, said pressing member pivotally mounted in the body in the direction of turning of the cover; and means for locking said pressing member in the course of transportation, the improvement comprising said means for locking the pressing member includes a toothed segment mounted in the body in a plane parallel to one intermediate wall and capable of limited movement in the plane of said one intermediate wall in mutually perpendicular directions, a system of pivotally interconnected adjacent levers for connecting said toothed segment to the cover, a tie for connecting the toothed segment to an axle secured to one intermediate wall, a lever with a toothed member for engaging the toothed segment in the course of transportation of said piece goods mounted on said axle and having a through slot near the toothed member thereof, a roller mounted on the pressing member in such a manner that its geometrical axis is parallel to axes of the journals of the pressing member and receivable within said through slot of said lever, an additional through slot in one intermediate wall accomodating the roller, at least one slot in said intermediate walls for accomodating the journals of said pressing member, and an axle for pivotally interconnecting said adjacent levers of said system of levers and mounted in one intermediate wall parallel to the at least one slot accomodating the journals of the pressing member.

2. A container according to claim 1, further comprising limited movement of the toothed segment by a longitudinal slot in the tie at the point of its connection with the axle and a stop secured to one intermediate wall and interacting with a portion of the toothed segment disposed near the bottom of the container.

* * * * *